United States Patent [19]

Overton et al.

[11] Patent Number: 4,913,859

[45] Date of Patent: Apr. 3, 1990

[54] METHODS OF CURING OPTICAL FIBER COATINGS

[75] Inventors: Bob J. Overton; Carl R. Taylor, both of Lawrenceville, Ga.

[73] Assignee: AT&T Bell Laboratories, Murray Hill, N.J.

[21] Appl. No.: 342,600

[22] Filed: Apr. 21, 1989

Related U.S. Application Data

[63] Continuation of Ser. No. 115,233, Oct. 30, 1987, abandoned.

[51] Int. Cl.$^4$ .................... B29C 47/02; G02B 6/02
[52] U.S. Cl. ......................... 264/1.4; 264/1.5; 264/22; 425/174.4; 427/163
[58] Field of Search ............. 264/1.4, 1.5, 22; 425/808, 174.4; 427/163

[56] References Cited

U.S. PATENT DOCUMENTS

| | | | |
|---|---|---|---|
| 2,266,392 | 12/1941 | Durant et al. | 118/643 |
| 3,596,125 | 7/1971 | Seigel | 313/22 |
| 4,076,510 | 2/1978 | Mracek et al. | 427/54 |
| 4,099,837 | 7/1978 | Vazirani | 427/54 |
| 4,100,418 | 7/1978 | Brown, Jr. | 250/510 |
| 4,101,424 | 7/1978 | Schooley et al. | 250/504 |
| 4,107,391 | 8/1978 | Moore et al. | 428/483 |
| 4,125,644 | 11/1978 | Ketley et al. | 427/54.1 |
| 4,324,575 | 4/1982 | Levy | 264/1.5 |
| 4,480,898 | 11/1984 | Taylor | 264/1.5 |
| 4,591,724 | 5/1986 | Fuse et al. | 250/454.1 |
| 4,636,405 | 1/1987 | Mensah et al. | 427/54.1 |

FOREIGN PATENT DOCUMENTS

| | | | |
|---|---|---|---|
| 0218244 | 8/1986 | European Pat. Off. | |
| 107943 | 6/1984 | Japan | 264/1.5 |
| 0107943 | 6/1984 | Japan | |

Primary Examiner—James Lowe
Attorney, Agent, or Firm—Edward W. Somers

[57] ABSTRACT

Drawn optical fiber is provided with at least one layer of a coating material. The coating material typically is a UV curable material and provides the optical fiber with mechanical and environmental protection. It has been found that the temperature at which the optical fiber is cured has a pronounced effect on the modulus of the cured coating material. In order to provide a coated optical fiber of which the coating material has a desired modulus, the temperature of the coating material during cure is controlled by controlling the amount of energy of infrared wavelength which impinges on the coating material.

11 Claims, 5 Drawing Sheets

METHODS OF CURING OPTICAL FIBER COATINGS

This application is a continuation of application Ser. No. 07/115,233, filed on Oct. 30, 1987, now abandoned.

TECHNICAL FIELD

This invention relates to method of curing optical fiber coatings. More particularly, it relates to methods of for curing coating materials which have been applied to optical fiber such that the coating materials have predetermined moduli.

BACKGROUND OF THE INVENTION

In the manufacturing of optical fiber, a glass preform rod which generally is manufactured in a separate process is suspended vertically and moved into a furnace at a controlled rate. The preform softens in the furnace and optical fiber is drawn freely from the molten end of the preform rod by a capstan located at the base of a draw tower.

Because the surface of the optical fiber is very susceptible to damage caused by abrasion, it becomes necessary to coat the optical fiber, after it is drawn, but before it comes into contact with any surface. Inasmuch as the application of the coating material must not damage the glass surface, the coating material is applied in a liquid state. Once applied, the coating material must become solidified rapidly before the optical fiber reaches a capstan. This may be accomplished by photocuring, for example.

Those optical fiber performance properties which are affected most by the coating material are strength and transmission loss. Coating defects which may expose the optical fiber to subsequent damage arise primarily from improper application of the coating material. Defects such as large bubbles or voids, non-concentric coatings with unacceptably thin regions, or intermittent coatings must be avoided. When it is realized that the coating thickness may be as much as the radius of an optical fiber, it becomes apparent that non-concentricity can cause losses in splicing, for example.

Transmission losses may occur in optical fibers because of a mechanism known as microbending. Optical fibers are readily bent when subjected to mechanical stresses, such as those encountered during placement in a cable or when the cabled fiber is exposed to varying temperature environments or mechanical handling. If the stresses placed on the fiber result in a random bending distortion of the fiber axis with periodic components in the millimeter range, light propagating in the fiber core may escape therefrom. These losses, termed microbending losses, may be very large. Accordingly, the fiber must be isolated from stresses which cause microbending. The properties of the fiber coating play a major role in providing this isolation, with coating geometry, modulus and thermal expansion coefficient being the most important factors.

Two types of coating materials are used to overcome this problem. Single coatings, employing a relatively high shear modulus, e.g. $10^9$Pa, or an intermediate modulus, e.g. $10^8$Pa, are used in applications requiring high fiber strengths or in cables which employ buffer tubes where fiber sensitivity to microbending is not a significant problem.

Dual coated optical fibers increasingly are being used to obtain design flexibility and improved performance. A reduction in the modulus of the coating material reduces microbending sensitivity by relieving stress caused in the fiber. Typically, an inner or primary coating layer that comprises a relatively low modulus material, e.g. $10^5$–$10^7$Pa, is applied to the optical fiber. The modulus of the primary coating should be effective in promoting long bending periods for the fiber which are outside the microbending range. Such a material reduces microbending losses associated with the cabling, installation or environmental changes during the service life of the optical fiber. In order to meet temperature conditions in expected areas of use, the low modulus coating material must be effective in the range of about $-40°$ to 77° C. An outer or secondary coating layer comprising a relatively high modulus material is applied over the primary layer. The outer coating layer is usually of a higher modulus material to provide abrasion resistance and low friction for the fiber and the primary coating layer. The dual coating serves to cushion the optical fiber by way of the primary layer and to distribute the imposed forces by way of the secondary layers, so as to isolate the optical fiber from bending moments.

One method of applying dual layers of coating materials to a moving optical fiber is disclosed in U.S. Pat. No. 4,474,830 which issued on Oct. 2, 1984, in the name of C. R. Taylor. An advanced system for applying dual coatings on drawn optical fibers is disclosed in application Ser. No. 092,117 which was filed on Sept. 2, 1987 in the names of J. A. Rennell and Carl R. Taylor.

After the coating material or materials have been applied to the moving optical fibers, the coating material or materials are cured, typically by exposure to ultraviolet radiation. In some coating systems, a primary coating material is applied and cured by subjecting it to ultraviolet energy prior to the application of the secondary coating material. If the primary coating material is not maintained at a sufficiently low temperature when the fiber enters apparatus which applied the second coating material, the viscosity of the primary coating material will be so low that variations of the first coating material can result. Such an undesired temperature can occur if an excessive amount of infrared radiation reaches the coating material. In U.S. Pat. No. 4,636,405, this is overcome by surrounding the optical fiber by a chamber that is transparent to ultraviolet light but which includes a jacket through which water flows to absorb the infrared energy.

It is most important that the shear modulus of the coating material on the optical fiber be in a range of desired values. Typically, samples of the coating material which is to be applied to the optical fiber are cured in sheet form, usually at room temperature, for evaluation. Studies have shown that whereas the modulus of a coating material in sheet form is satisfactory, its value exceeds that of the coating material after it has been applied to the optical fiber and cured.

Seemingly, the prior art does not include a coating and curing arrangement which applies coating material within an applicator at relatively high line speeds, and which is accomplished to control the modulus of the cured coating material. What is sought and what is not provided is a system for applying coating materials to optical fiber in which the cured coating material on the optical fiber has a modulus which falls in a desired range. In order to be able to have assurance regarding the modulus of the coating materials after having been applied to optical fiber, reliance must be had on the test results. Methods need to be provided to insure that the modulus of a curable coating material after it has been applied to the optical fiber and cured will be the same as the determined and found acceptable from test results.

SUMMARY OF THE INVENTION

In accordance with the methods of this invention, the foregoing problems have been overcome by the methods and apparatus of this invention. In accordance with the methods of this invention, after an optical fiber has been drawn, it is provided with a coating material. Afterwards, the coating material is cured.

Typically, a coating system for an optical fiber includes an inner or primary layer of a curable coating material enclosed by an outer or secondary layer. The primary coating which is generally referred to as a buffer layer has a modulus which is less that that of the outer layer.

The modulus properties of the buffer layer are critical for protection against microbending. In the past, candidate materials have been characterized in cured sheet form, with the assumption that the properties would be similar when cured on optical fiber. A technique for measuring the in situ modulus of the buffer layer, for example, on dual coated fiber has revealed discrepancies between the modulus of a candidate coating material in cured sheet form and as cured on optical fiber. The discrepancies were attributed to dissimilar curing conditions and have been traced to differences in the temperature at cure as between the sample and the coating material on the optical fiber.

In accordance with the methods of this invention, curing of the coating material is accomplished while the coating material is at predetermined temperature. Inasmuch as it has been determined that the modulus of the coating material decreases as its temperature during curing increases, the correlation between these two parameters is used to control the modulus of the coating material after it has been applied to the moving optical fiber and while it is being cured.

An apparatus for controlling the temperature of the coating material of the optical fiber while it is being cured may include a quartz tube through which the optical fiber is moved. An ultraviolet lamp is disposed in a housing in which the quartz tube also is disposed. An infrared absorbing gas is flowed through the quartz tube and may also be flowed through the housing. The temperature and the composition of the gas determine the amount of infrared absorption and hence the temperature of the coating material or materials on the moving optical fiber during ultraviolet curing of the coating material or materials. The modulus of the cured coating material or materials is a function of that temperature during cure.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
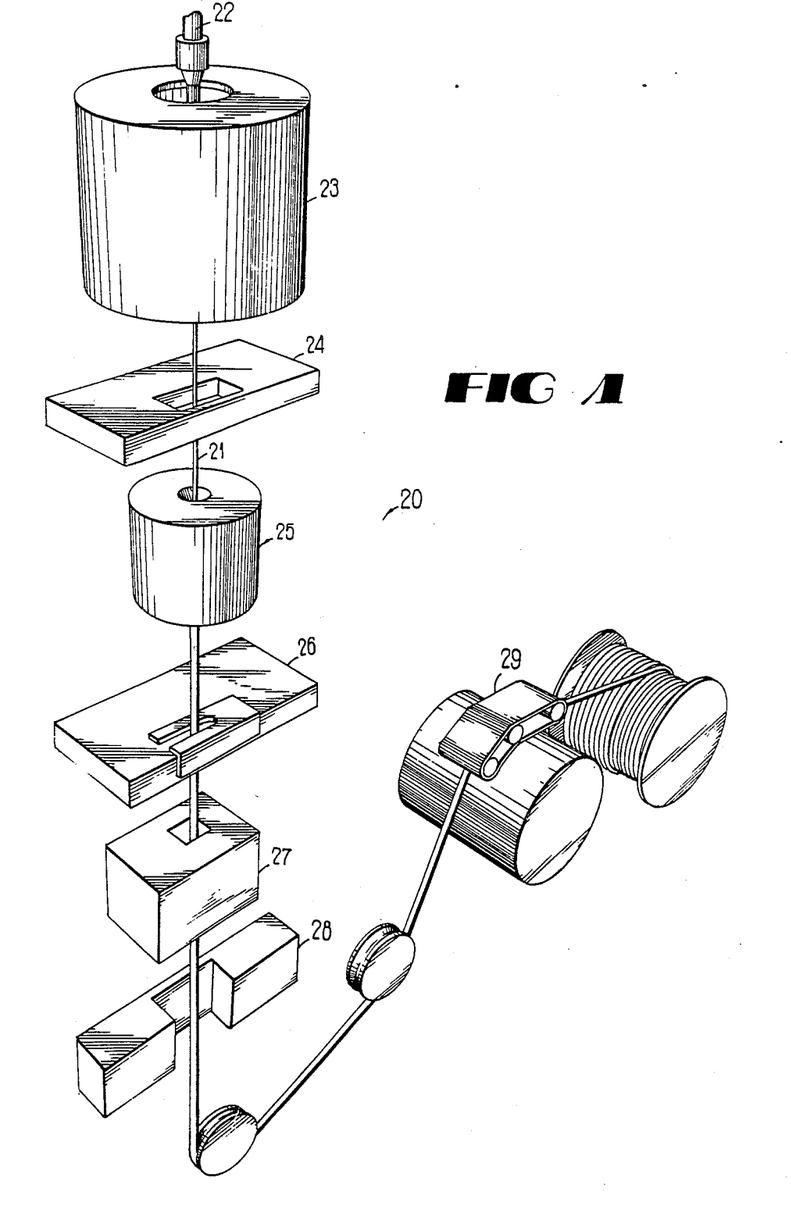
FIG. 1 is an overall perspective view of a portion of a manufacturing line on which optical fiber is drawn from a preform and covered with one or more coatings of a polymeric material.

Referring now to FIG. 1, there is shown an apparatus which is designated generally by the numeral 20 and which is used to draw an optical fiber 21 from a specially prepared cylindrical preform 22 and then to coat the optical fiber. The optical fiber 21 is formed by locally and symmetrically heating the preform 22 which typically is about 17 mm in diameter and 60 cm in length to a temperature of about 2000° C. As the preform 22 is fed into and through a furnace 23, optical fiber 21 is drawn from the molten material.

As can be seen in FIG. 1, the draw system includes the furnace 23, wherein the preform 22 is drawn down to the optical fiber size, after which the optical fiber 21 is pulled from the heat zone. The diameter of the optical fiber 21 which is measured by a device 24 at a point shortly after the furnace 23 becomes an input into a control system. Within the control system, the measured diameter is compared to the desired value and an output signal is generated to adjust the draw speed such that the fiber diameter approached the desired value.

After the diameter of the optical fiber 21 is measured, a protective coating or coatings is applied by an apparatus 25. Then, after the coated optical fiber 21 is passed through a centering gauge 26, an ultraviolet (UV) device 27 for treating the coating material to cure the coating material and a device 28 for measuring the outer diameter of the coated fiber, it is moved through a capstan 29 and is spooled for testing and storage prior to subsequent operations or sale. The preservation of the intrinsically high strength of optical fibers is important during the ribboning, jacketing, connectorization and cabling of the optical fibers and during their service lives.

As mentioned hereinbefore, it is frequently commonplace to apply dual coatings to a drawn optical fiber. These provide protection for the optical fiber, as well as render the optical fiber more flexible than with a single coating layer.

Figure 2:
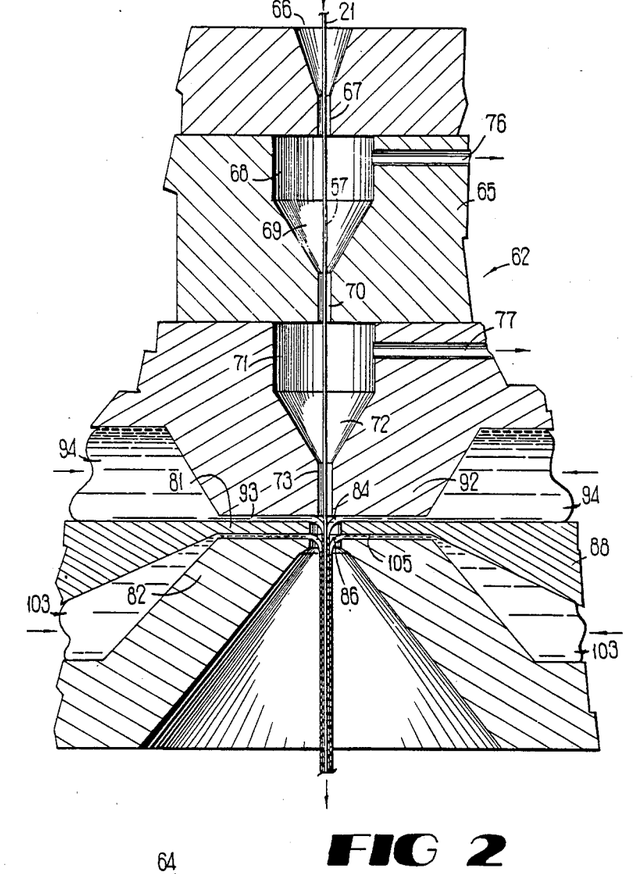
FIG. 2 is an elevational view in section of an apparatus for applying dual layers of coating materials to a moving optical fiber.
Figure 3:
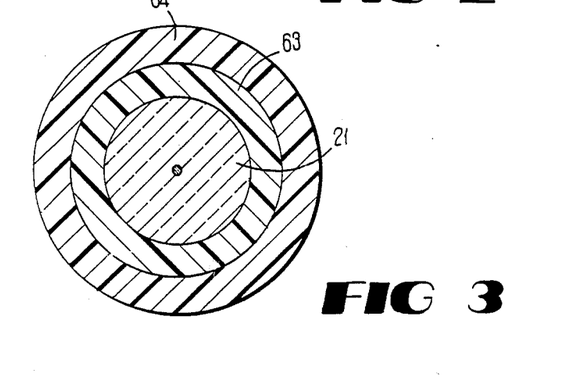
FIG. 3 is an end cross sectional view of an optical fiber which includes dual layers of coating materials.

Going now to FIG. 2, there is shown a preferred embodiment of a coating applicator 62 of this invention for applying dual layers of coating materials to a moving optical fiber. The applicator has an axis 57 along which the optical fiber is moved. An optical fiber 21 having dual layers of coating materials 63 and 64 thereon is shown in FIG. 3. The applicator 62 is used to apply a single layer 63 and 64 each of coating materials (see FIG. 3) to an optical fiber 21. For example, the drawn optical fiber 21 has an outer diameter of about 125 μm and includes two layers of coating materials which have an overall diameter of about 250 mm.

The coating applicator 62 includes a housing 65 having a flared entrance 66 into which successive increments of the optical fiber 21 are advanced. The flared entrance 66 connects to a cylindrical passageway 67 which opens to a first chamber 68. A lower portion 69 of the first chamber 68 is conically shaped and communicates with a cylindrical passageway 70 which opens to a second chamber 71. A lower portion 72 of the second chamber 71 is conically shaped and communicates with a cylindrical passageway 73.

The applicator 62 is caused to be operated such that a pressure differential exists between the chambers 68 and 71 and the ambient atmosphere with the ambient pressure being greater than that in the chambers. In a preferred embodiment, the chambers 68 and 71 are connected along lines 76 and 77, respectively, to a source of vacuum (not shown in FIG. 2).

Aligned with the cylindrical passageways 67, 70 and 73 are first and second dies 81 and 82 having die openings 84 and 86, respectively. Each of the die openings 84 and 86 is defined by a wall which is called a land. As used herein, the term "die" denotes that portion of the applicator which last confines or aids in confining a given coating layer around the fiber. Unlike some prior art apparatus, it does not necessarily determine directly the size of the coating layer. It should be observed that the die openings 84 and 88 (see also FIG. 4) which are associated with the first and second dies, respectively, have a substantially larger diameter than those of the passageway 73. On the other hand, the diameters of the passageways 67 and 70 can be larger or smaller than those of the die openings. However, in a preferred embodiment they are relatively small to inhibit the inflow of air. Typically, each of the openings 84 and 86 has a diameter which is equal about to the product of 1.5 and the outer diameter of the optical fiber.

Furthermore, the applicator is arranged to provide flow paths for two coating materials. A die block 88 of the first die 81 includes a surface 89 which is parallel to and spaced from a surface 91 of a portion 92 of the housing. Such a disc-like flow path is shown in earlier mentioned C. R. Taylor U.S. Pat. No. 4,474,830 and in U.S. Pat. No. 4,512,944 which issued on Apr. 23, 1985 in the names of G. Astfalk, et al., both of which patents are incorporated by reference hereinto. The clearance between the surfaces 89 and 91 define a flow path 93 for a first coating material 94 which provides the cushioning layer 64 for the optical fiber. The flow path 93 has at least a component that is normal to the path of travel of the optical fiber along the longitudinal axis 57. In a preferred embodiment, the flow path 93 is disc-like and is normal to the path of travel of the optical fiber. Further, the thickness of the flow path 93 in a direction parallel to the path of travel of the optical path is relatively small, being on the order of about 2 to 10 mils. That dimension of the clearance which is parallel to the path of travel of the optical fiber along the axis 57 in the vicinity of the point of application of the coating material is referred to as its thickness and typically is less than three times the fiber diameter. Preferably, the clearance is less than twice the optical fiber diameter.

The small thickness of the clearance or flow path in the direction of the path of travel of the optical fiber is desirable in order to prevent the formation of eddys in the coating material 94 which is flowed along the flow passage 93 from a source (not shown). Such an eddy or recirculation current can cause undesirable instabilities which may result in the formation of bubbles in the layer 63 of coating material.

Also, a second coating material 103 is pressure fed along a flow path 105 formed between surfaces 107 and 109 of the dies 81 and 82 over the first coating material 94 and between the first coating material and a land 110 of the second die. The flow path 105 also has at least a component that is normal to the path of travel of the optical fiber, and in the preferred embodiment is normal to the axis 57.

For the flow path 105, the thickness also is less than the product of three and the diameter of the optical fiber, and preferably less than 2 times the diameter. The small thickness is desirable to prevent the formation of an eddy of each coating liquid in the vicinity of the point of application. Such recirculation can cause undesirable instabilities and mixing about the optical fiber or with the previously applied first coating. In addition, it has been found desirable to form the clearance associated with the second die by surfaces perpendicular to the fiber axis 57. As a result, each coating liquid in its associated clearance region flows perpendicularly to the axis of fiber until entering the transition region in the immediate vicinity of the moving optical fiber.

Figure 4:
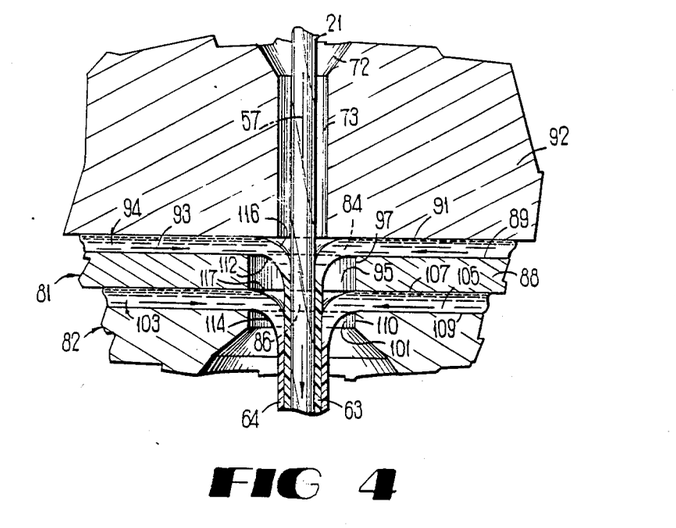
FIG. 4 is a detail view of a portion of the apparatus of FIG. 3.

In the arrangement shown in FIGS. 2 and 4, an optical fiber 21 is passed through the first coating die 81 and thereafter into the second coating die 82 located near the exit of the first die. In order to facilitate removal of air from the chambers 68 and 71, the diameters of the conduits 76 and 77 are relatively large. In the preferred embodiment, these parameters are such that the ratio of each of the diameters of the conduits 76 and 77 to the diameters of the passageways 67 and 70, respectively, is about ten to one. The first coating liquid 94 is pressure fed along the flow path 93 onto the optical fiber through the clearance formed between the surfaces 89 and 91 and the second coating material 103 is pressure fed along the flow path 105.

The fiber draw rate, the pressure feed of the coating materials and the diameter of the aperture of the die around the optical fiber together with the direction of the flow path are chosen so that a gap forms between the first coating material and the land of the die 81 and between the second coating material and the land of the die 82. As can best be seen in FIG. 4, a gap 95 is formed between the first coating material and a land 97 of a first die. Also, a gap 101 is formed between the second coating material and the land 110 of the second die. In this manner, each coating liquid is preferably applied onto the optical fiber or onto the inner layer of coating material through a membrane bounded by free surfaces, that is, unconstrained by a solid surface in the immediate vicinity of the point at which the first coating material is applied to the optical fiber or at which the second coating material is applied to the first coating. Each gap desirably extends into the aperture of die at least as far as the initial point of contact of the coating liquid with the moving substrate. Instabilities and nonuniformities associated with prior art techniques are eliminated substantially.

The gaps 95 and 101 are effective to allow free surfaces 112 and 114 to be formed between the coating materials 94 and 103 and the lands 97 and 110, respectively Also, it should be noted that free surfaces 116 and 117 are formed and cooperate with the free surfaces 112 and 114, respectively, to define membranes of the coating materials 94 and 103, respectively, after they emerge from their respective flow paths and are directed toward the optical fiber 21. These gaps are allowed to develop because of the pressure differentials between the chambers and ambient atmosphere. Without those pressure differentials, masses of bubbles will form about the juncture of the moving optical fiber 21 and the coating liquids, destroying the membranes bounded by free surfaces and causing the die openings to be filled with the coating materials.

The presence of a free surface in the die opening avoids the development of a shear field between the associated land and the moving optical fiber. This is particularly important in the second die where the shear field would develop between the layer of first coating material and the second which would disrupt the layer already on the optical fiber. The formation of the gaps helps provide for a smooth transition in the flow of the coating liquids onto the optical fiber and onto the first or inner layer coating material in the region of the dies. It also helps to decouple the gap from any irregularities in the flow of the coating liquids.

Each coating liquid in the present technique accelerates to the fiber velocity by elongational flow in the vicinity of the free surfaces, and there are thus no abrupt changes in the coating liquid velocity as it is applied to the fiber and to the first coating. This technique avoids shear between the first coating material and the land 97 and between the first and second coating liquids and the land 110, thereby substantially reducing the possibility of mixing between the first and second coating liquids. Once the coating process has reached a stable, steady state condition, the gaps are substantially isolated from the atmosphere and at least partially evacuated. This is because the first coating liquid in the upper portion of the die forms a hermetic seal on one side, whereas the second coating liquid likewise forms a hermetic seal on the other side of the applied first coating in the vicinity of the gap 101. This is very advantages in reducing the possibility of bubble entrapment in the second coating material, because there is no contact with the atmosphere that would allow for bubble entrapment between the first and second coatings.

A further advantage is derived from the formation of the gasp 95 and 101. Because of them, the diameter of the coated optical fiber may be adjusted by adjusting the pressure feed of the coating materials 94 and 103.

In the apparatus 62, with the pressure for the first coating material adjusted as noted above for a given fiber line speed, the diameter of the optical fiber enclosed in a layer of the first coating material is determined mainly by the feed pressure of the first coating material. Also, the thickness of the layer of second coating material can readily be adjusted by changing the feed pressure of the second coating material. A desirable feature of the present technique is that the first and second coating thicknesses each can thus be independently adjusted. Because the coating materials are introduced by a pressure feed through rigid orifices, a uniform concentric thickness of the coatings can be maintained.

Another advantage of the hereinbefore-described arrangement relates to the reduced cooling of the drawn fiber which is necessary before it is moved into the coating applicator. The air adjacent to the moving optical fiber functions as a heat sink. As its temperature rises, so does its viscosity which increases the probability for entrainment into the liquid coating material. Because of the established pressure differential, there is substantially no air in the passageway 73 of the dual applicator 62 to undergo an increase in viscosity and none to be entrained. Further, because of the relatively short time the optical fiber is in contact with a coating liquid, prior to it forming a layer or layers on the optical fiber, there is insufficient time for the viscosity of the coating material to be reduced appreciably. Less cooling of the drawn optical fiber is necessary and higher line speeds may be used.

After the coating material or coating materials have been applied to the moving optical fiber, the coating material or materials are cured. Typically, the coating or coatings are such that they are curable by exposure to ultraviolet (UV) radiation. As mentioned earlier, some optical fiber manufacturers cure what is to become the inner layer prior to the application and the curing of the outer layer.

Figure 5:
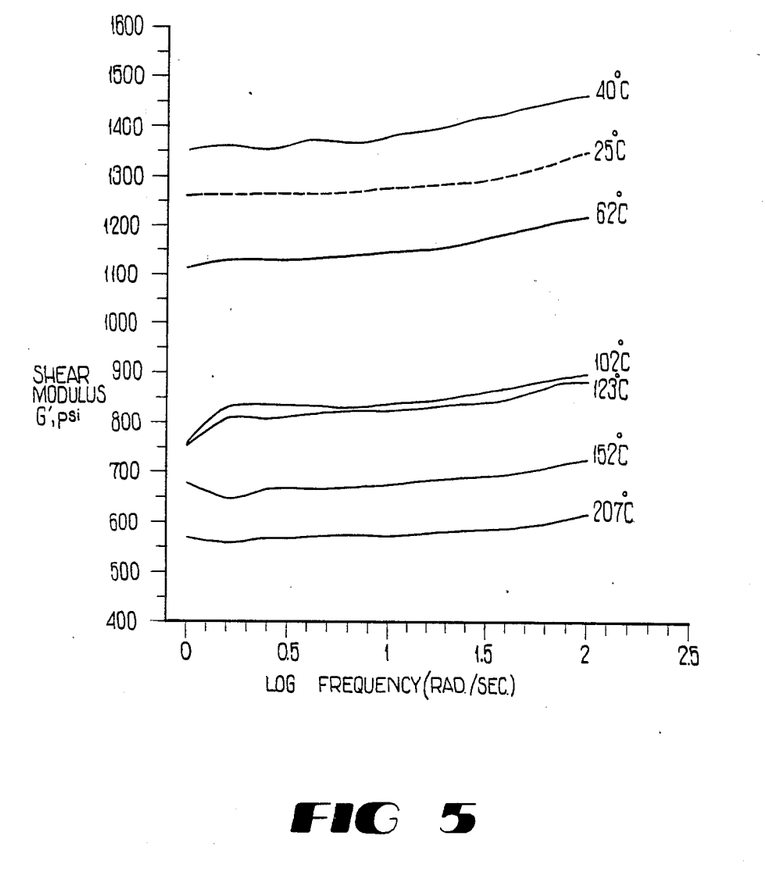
FIG. 5 is a view of a graph which shows the relationship between temperature of a coating material on an optical fiber during cure and its resulting modulus.

It has been found that the modulus of the UV curable coating material on the optical fiber is a function of the temperature at which the curing of the coating material occurred. This relationship for a particular coating material is shown in FIG. 5. As can be seen there, generally, the higher the temperature during cure, the lower is the shear modulus of the cured material. The material in FIG. 5 at each temperature level is fully cured and the modulus is not raised by further exposure to radiation. The broken line curve at 25° C. orresponds to room temperature.

Figure 6:
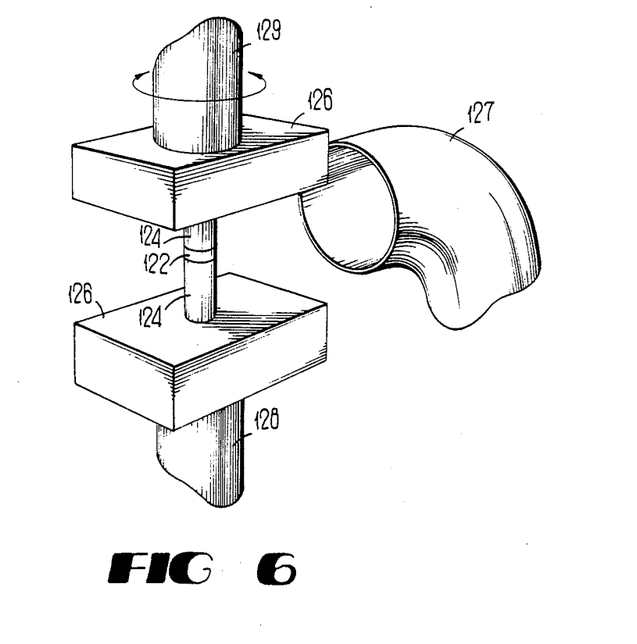
FIG. 6 is a schematic view of a test arrangement for determining modulus at various temperatures.

An apparatus 120 (see FIG. 6) has been constructed to allow a primary coating material sample 122 held between ferrules 124—124 extending from grips 126—126 to be cured at elevated temperatures by exposure to a UV gun 127, simulating conditions on a draw toner. Because both coating layers are applied and cured substantially simultaneously, primary coating materials are cured in a geometry to minimize atmospheric exposure. After cure, the 25° C. shear modulus is measured in an oscillatory mode by a transducer 128 as one grip is oscillated by a device 129. For several candidate primary coatings, the modulus shows a strong, inverse dependence on temperature of cure. These results explained the discrepancies encountered in past measurements of properties.

The cure temperature dependence of the modulus may be explained as follows. UV cured coatings polymerize by a free radical mechanism, possible because the prepolymers are relatively long chain structures, or oligomers, which are capped on either end by an acrylate functional group. A UV-generated initiator such as a photinitiator, for example, consisting of a small molecule with a free, or unpaired, electron, encounters the acrylate functional group and bonds with the group. One of the double bonds in the acrylate group breaks, providing one electron to a new bond with the initiator and one electron to become a new unpaired electron, referred to as the free radical, now present at the oligomer-initiator junction. This free radial attacks the acrylate group on another oligomer molecule, forming a new bond and a new free radical. The original acrylate group now forms a junction for three molecules. The new free radial encounters another acrylate group and the chain reaction continues. Inasmuch as both ends of the molecules are capable of the chain growth reaction, a crosslinked structure is formed quickly.

The modulus of the cured coating is proportional to the crosslink density, or number of crosslinks per unit volume. Ordinarily, the termination mechanism ending the propagation of the crosslinking mechanism is far, far slower than the crosslinking reaction.

At relatively high cure temperatures, the termination reactions are greatly accelerated relative to the crosslinking reaction, and/or the termination mechanism may favor disproportionation over coupling. The effect of the acceleration is not only to decrease the trifunctional crosslink growth, but also to leave free ends, further reducing the degree to which the molecules are tied together and hence reducing the modulus.

In the curing device 27 (see FIG. 1) which includes UV lamps, it has been determined that a component of the radiation having an infrared (IR) wavelength is responsible for causing the temperature of the coating material during curing to be in the range of about 200° C. As can be seen from FIG. 5, such a temperature level causes the modulus to decrease, possibly to a value which may be below that desired.

Typically, a curing chamber (see FIG. 7) is provided with a housing 132. Disposed within the housing 132 is a quartz tube 134 having a longitudinal axis 136 parallel to that of the housing. The quartz tube 134 is adapted to have the drawn optical fiber moved therethrough and has an inner diameter of about 2.5 cm and a thickness of about 1 mm. Also disposed within each chamber is an elongated quartz halogen lamp 138 which parallels the path of the optical fiber and which emits ultraviolet radiation that is used to cure the coating material or materials. The lamp 138 and the quartz tube 134 through which the fiber is moved are located at the focii of elliptical mirrors 139—139 to ensure that substantially all of the periphery of the moving optical fiber is impinged by light emitted by the lamp 138.

Figures 7, 8:
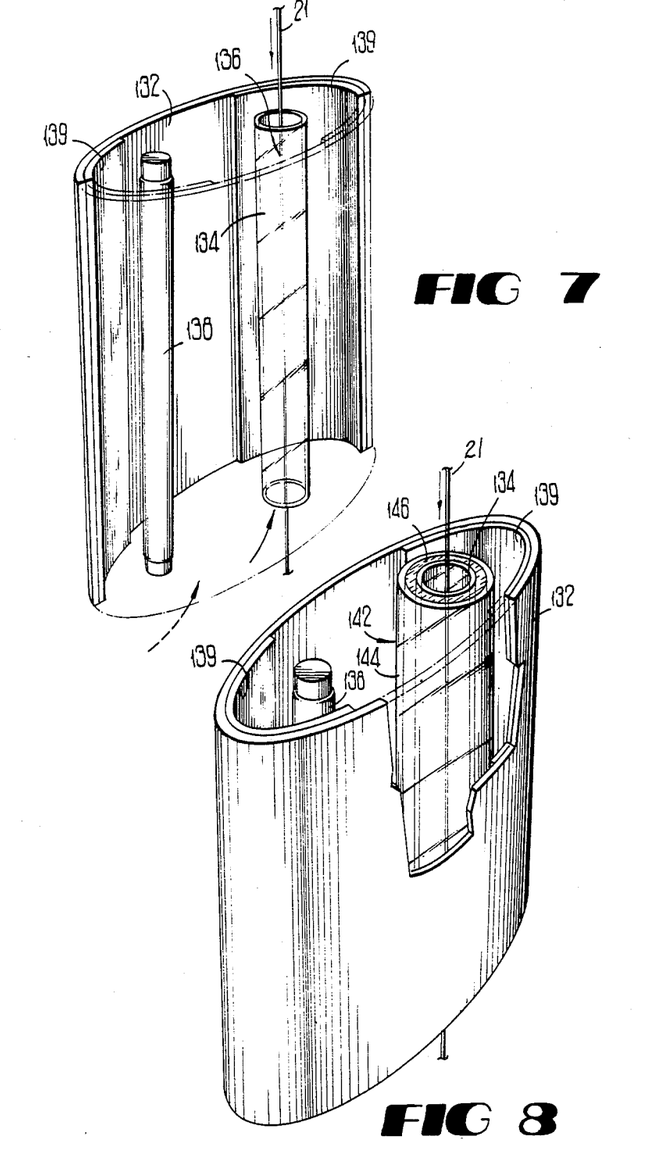
FIG. 7 is an enlarged view of an apparatus used to cure coating materials.
FIG. 8 is a view of another embodiment of this invention for curing a coating material on a moving optical fiber.

The quartz tube 134 through which the optical fiber is moved is transparent to ultraviolet radiation from the lamp. Consequently, the use of such a tube does not impair the curing of the coating material on the moving optical fiber. The ultraviolet curing of the coating materials on the optical fiber is accomplished with energy in the wavelength range of about 200 to 400 nm. However, the ultraviolet source emits a much wider spectrum with energies outside this range. Portions of the energies outside this range, specifically infrared radiation, can lead to excessive generation of heat in the chamber. This causes the quartz tube to reach a temperature of about 400° and the fiber moving through the quartz tube 134 to reach a temperature of about 200° during the curing of the coating materials thereon.

The problem of unwanted variation in the modulus of the cured coating material is overcome by controlling the temperature during cure. It has been found that the IR component from the UV source can be screened without diminishing the UV dose by the use of an IR-absorbing gas mixture in the cure oven.

In a preferred embodiment of this invention, an IR-absorbing gas is caused to be moved through the quartz tube 134 and through the housing 132. The gas is at a predetermined composition and temperature so that it modulates the IR component of the energy reaching the coatings on the optical fiber. In this way, the temperatures of the coating materials on the moving optical fiber are tuned to values which controls the resulting moduli of the cured coating materials. Preferably, the IR absorbing gas is effective to cause the curing to occur at a predetermined temperature which is in the range of about 25° to 200° C.

The gas composition is chosen to be relatively transparent to UV radiation. A suitable gas is a mixture of carbon dioxide and water. Moist air also is suitable to function as an IR absorbing gas.

The temperature of the gas is a function of the flow rate of the gas. Should it be easier to have the gas flowing through at a lower temperature, the flow rate is increased.

As can be seen by viewing FIG. 5, the modulus of the coating material on the optical fiber can be correlated to the temperature during cure. Should the modulus of the coating material being used be too high, the gas flowed through the quartz tube and/or the housing 132 may be discontinued or be at a composition and temperature which is sufficient to cause the resulting modulus to be reduced to a specified value through increased IR heating at cure. If the modulus of the raw coating material is about what is desired in the finished product, the gas is at a composition and temperature which are sufficient to ensure that the modulus is not reduced during cure. The modulus of the fully cured coating material on the optical fiber is not changed upon further exposure to radiation.

Although in the embodiments disclosed herein, the UV source emits a strong IR energy component which is filtered to remove a predetermined amount of the IR energy before it reaches the optical fiber, the invention is not so limited. For example, there may be instances where energy of the infrared wavelength is introduced into engagement with the curable material in order to obtain a cured material having a desired modulus.

In another embodiment, (see FIG. 8), a tubular member 142 includes the tube 134 having a jacket 144 disposed concentrically thereabout and spaced therefrom. This arrangement provides a chamber 146 through which a fluid such as an IR absorbing gas or water which is transparent to UV radiation is flowed. The coating on the moving optical fiber is cured by the ultraviolet radiation from the lamp 138, but is caused to be at a controlled temperature during cure.

The radial thickness of the chamber 146 also may be used to cause the cure temperature during cure.

The radial thickness of the chamber 146 also may be used to cause the cure temperature to be a predetermined value. Typically, the radial thickness of the chamber is about 1 cm. As a result of controlling the coating temperature, the moduli of the coating materials are predetermined values which correspond to those obtained during testing by means of the apparatus configuration of FIG. 6.

Furthermore, such an arrangement may be used to remove only a portion of the infrared component of the UV radiation. The liquid being flowed through the jacket may be a mixture of water and another material such as alcohol or an organic solvent which is less IR absorbing.

It should be understood that the above-described arrangements are simply illustrative of the invention. Other arrangements may be devised by those skilled in the art which will embody the principles of the invention and fall within the scope and spirit thereof.

What is claimed is:

1. A method of making an optical fiber having a layer of coating material thereon, said method including the steps of:

drawing an optical fiber from a preform;

applying a curable coating material to the drawn optical fiber;

exposing the curable coating material to radiant energy to cure the coating material, the radiant energy ranging from infrared through ultraviolet frequencies with a portion thereof being effective to cure the coating material and with portions thereof having frequencies outside the range of frequencies which are used to cure the coating material and which are absorbed by said coating material thereby causing heating of the coating material;

controlling said step of exposing the curable coating material to the radiant energy to modulate those portions of the radiant energy which are outside the useful curing range and which cause heating of the curable coating material and thereby to control the energy influx into and the heating profile of the coating material during its cure and thereby cause the modulus of cured material to be a desired value; and taking up the drawn, coated optical fiber.

2. The method of claim 1, wherein the temperature at which the coating material is cured is controlled to be in the range of about 25° to 200° C. to cause the cured coating material on the optical fiber to have a predetermined modulus.

3. The method of claim 2, wherein said coating material is cured by advancing the coated optical fiber through a tube, wherein the source emits a substantial component of energy having an infrared wavelength and which also includes the step of moving an infrared radiation absorbing gas through the tube, the gas being of a composition and at a temperature to cause the coating on the optical fiber to cure at a temperature which results in the predetermined modulus.

4. The method of claim 4, wherein an infrared radiation absorbing gas also is flowed between the source of ultraviolet radiation and the tube.

5. The method of claim 1 wherein the optical fiber is provided with an inner coating and an outer coating, said inner coating being cured before the application of the outer coating.

6. The method of claim 1, wherein said coating material is cured by advancing the optical fiber through a tube which has a chamber disposed thereabout and said step of controlling includes the step of moving a liquid through the chamber to absorb energy of infrared wavelength.

7. The method of claim 6, wherein the liquid in the chamber is a mixture comprising at least an infrared absorbing composition.

8. The method of claim 1, wherein the optical fiber is provided with an inner coating and an outer coating, and wherein the inner and outer coatings both are applied prior to the step of curing.

9. The method of claim 8, wherein said step of applying includes the steps of:

moving the drawn fiber along a path of travel into and through a chamber in a housing;

moving the optical fiber from the chamber past a first disc-like flow path, a first die opening, a second disc-like flow path and then through a second die opening, each of the flow paths having at least a component that is normal to the path of travel of the optical fiber and each of the die fiber; and applying a source of vacuum to the chamber; while causing first and second coating materials to be flowed along the first and second flow paths, respectively, generally radially inwardly toward the path of travel of the optical fiber to coat the fiber as it is moved through the first and then through the second die opening, the thickness of each flow path in the direction of the path of travel being such that substantially no recirculation of the coating material flowing therein occurs in the vicinity of the application of the coating materials to the optical fiber and wherein the steps of moving the optical fiber and causing the coating materials to be flowed and the die openings and the directions of the flow paths are such that a gap forms between each of the coating materials and an associated die surface with each coating material as it exits the flow path and is directed into engagement with the moving optical fiber being bounded by free surfaces.

10. The method of claim 9, wherein each of the gaps extend into the associated die opening at least as far as the point at which the associated coating material first contacts the optical fiber.

11. A method of controlling the modulus of a curable material which is cured by exposure to ultraviolet radiation, said method including the steps of:

exposing a curable coating material to radiant energy to cure the coating material, the radiant energy ranging from infrared through ultraviolet frequencies with a portion thereof being effective to cure the coating material and with portions thereof having frequencies outside the range of frequencies which are used to cure the coating material and which are absorbed by said coating material thereby causing heating of the coating material; and controlling said step of exposing the curable coating material to the radiant energy to modulate those portions of the radiant energy which are outside the useful curing range and which cause heating of the curable coating material and thereby to control the energy influx into and the heating profile of the coating material during its cure and thereby cause the modulus of the cured material to be a desired value.

* * * * *